(12) United States Patent
Honkanen

(10) Patent No.: US 12,150,401 B2
(45) Date of Patent: Nov. 26, 2024

(54) SYSTEM FOR MEASURING AND INTERPRETING A FORCE

(71) Applicant: KUBOTA Corporation, Osaka (JP)

(72) Inventor: Joel Honkanen, Kleppe (NO)

(73) Assignee: KUBOTA Corporation, Osaka (JP)

( * ) Notice: Subject to any disclaimer, the term of this patent is extended or adjusted under 35 U.S.C. 154(b) by 372 days.

(21) Appl. No.: 17/774,707

(22) PCT Filed: Nov. 6, 2020

(86) PCT No.: PCT/EP2020/081337
§ 371 (c)(1),
(2) Date: May 5, 2022

(87) PCT Pub. No.: WO2021/089813
PCT Pub. Date: May 14, 2021

(65) Prior Publication Data
US 2022/0391644 A1    Dec. 8, 2022

(30) Foreign Application Priority Data

Nov. 8, 2019 (EP) .................................. 19208122
Apr. 30, 2020 (EP) .................................. 20172320

(51) Int. Cl.
*G06F 18/21* (2023.01)
*A01B 63/112* (2006.01)
(Continued)

(52) U.S. Cl.
CPC .......... *A01B 79/005* (2013.01); *A01B 63/112* (2013.01); *G01L 1/00* (2013.01);
(Continued)

(58) Field of Classification Search
CPC .......... G06N 20/00; G06N 3/08; G06N 3/088; G06N 3/09; G06N 3/092; G06N 3/0464;
(Continued)

(56) References Cited

U.S. PATENT DOCUMENTS

| 8,406,966 B2 | 3/2013 | Schedgick et al. |
| 2014/0215984 A1 | 8/2014 | Bischoff |

(Continued)

FOREIGN PATENT DOCUMENTS

| EP | 0857325 B1 | 5/2002 |
| EP | 3420787 A1 | 1/2019 |
| WO | 2016/123201 A1 | 8/2016 |

OTHER PUBLICATIONS

International Search Report and Written Opinion of the International Searching Authority for corresponding International Patent Application No. PCT/EP2020/081337, mailed on May 4, 2021.

(Continued)

*Primary Examiner* — Matthew C Bella
*Assistant Examiner* — Dennis Rosario
(74) *Attorney, Agent, or Firm* — Renner, Otto, Boisselle & Sklar, LLP

(57) ABSTRACT

A system (1) for measuring and interpreting a force, comprises at least one working implement, for acting on an agricultural field and at least one force sensor, for measuring a force of the working implement. Further, a data interpretation unit calculates an interpretation of the measured force; wherein the data interpretation unit comprises a machine learning unit that calculates the interpretation of the measured force. Also, a system for controlling agricultural operations comprises at least one agricultural working means for working on an agricultural field and at least one first imaging device located at the agricultural working means for acquiring images of an environment of the agricultural working means.

15 Claims, 3 Drawing Sheets

Figure 1:
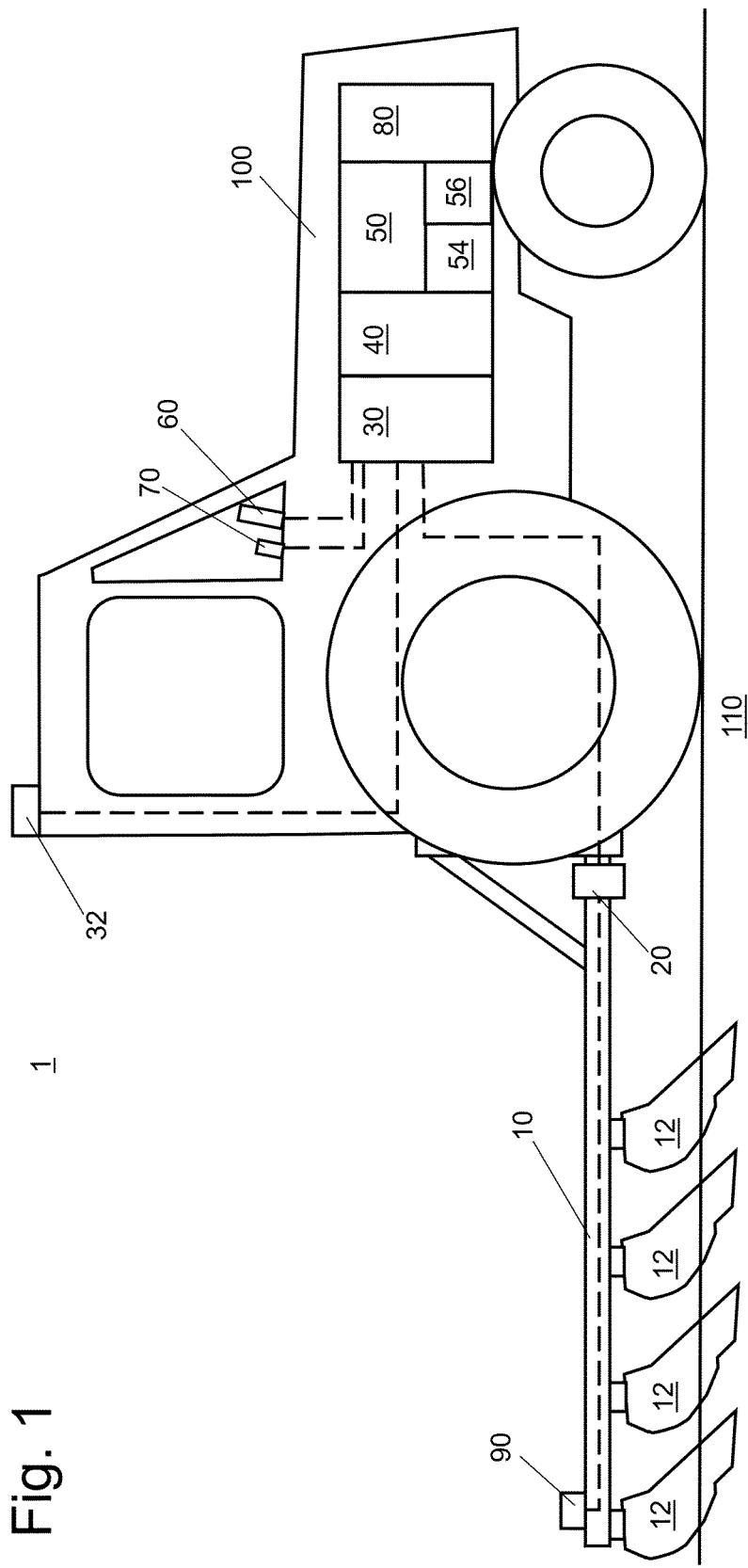

(51) Int. Cl.

| | |
|---|---|
| *A01B 79/00* | (2006.01) |
| *G01L 1/00* | (2006.01) |
| *G01L 5/22* | (2006.01) |
| *G06F 18/2413* | (2023.01) |
| *G06N 5/045* | (2023.01) |
| *G06N 20/00* | (2019.01) |
| *G06V 10/776* | (2022.01) |
| *G06V 10/82* | (2022.01) |
| *A01B 61/00* | (2006.01) |
| *A01B 69/00* | (2006.01) |
| *G05B 13/02* | (2006.01) |
| *G05D 105/15* | (2024.01) |

(52) U.S. Cl.
CPC ........ *G06F 18/217* (2023.01); *G06F 18/2178* (2023.01); *G06F 18/24133* (2023.01); *G06N 5/045* (2013.01); *G06N 20/00* (2019.01); *G06V 10/776* (2022.01); *G06V 10/82* (2022.01); *A01B 61/00* (2013.01); *A01B 69/001* (2013.01); *G01L 5/228* (2013.01); *G05B 13/027* (2013.01); *G05B 2219/45017* (2013.01); *G05D 2105/15* (2024.01)

(58) Field of Classification Search
CPC ...... G06N 3/02; G06N 5/045; G05B 23/0283; G05B 23/0262; G05B 23/0259; G05B 2219/37434; G05B 23/0294; G05B 23/00; G05B 23/0205; G05B 23/0272; G05B 2219/37351; G05B 13/027; G05B 13/0285; G05B 13/029; G05B 2219/45106; G05B 2219/45003; G05B 2219/45012; G05B 2219/45017; G06F 18/217; G06F 18/2178; G06F 18/2185; G06F 30/27; G06V 10/82; G06V 10/70; G06V 20/188; G06V 20/13; G06V 10/776; G06Q 10/0639; G06Q 50/02; A01B 3/00; A01B 3/04; A01B 3/24; A01B 3/36; A01B 3/46; A01B 3/50; A01B 3/64; A01B 5/00; A01B 5/04; A01B 5/16; A01B 7/00; A01B 9/00; A01B 13/00; A01B 13/025; A01B 15/16; A01B 17/00; A01B 19/00; A01B 21/00; A01B 21/08; A01B 21/083; A01B 21/086; A01B 23/00; A01B 23/06; A01B 25/00; A01B 31/00; A01B 3/02; A01B 61/04; A01B 63/112; A01B 79/005; A01B 69/001; A01B 76/00; A01B 69/00; A01B 15/20; A01B 59/00; A01B 61/00; G06T 2207/20081; G06T 2207/20084; G06T 7/0004; G06T 2207/10032; G06T 2207/30128; G06T 2207/30108; B25J 9/163; B29C 64/379; G05D 2101/15; G05D 1/0246; G05D 1/0251; G05D 1/0253; G05D 1/2247; G05D 1/2248; G05D 2105/15; G05D 15/00; G05D 16/00; G05D 17/00; B60W 2300/15; B60W 2300/152; B60W 2300/158; B60W 2300/156; B60W 2300/154; G08G 1/165; G08G 1/166; G08G 1/20; G01H 1/00; G01H 9/00; G01H 11/00; B64U 2101/40; G01P 1/023; G01P 15/02; G01P 15/00; G01P 15/08; G01P 15/13; G01P 15/135; G01P 15/14; G01P 15/032; G01L 5/228; G01L 1/00; G01L 5/0052; G01L 5/0033
See application file for complete search history.

(56) References Cited

U.S. PATENT DOCUMENTS

| | | |
|---|---|---|
| 2018/0068416 A1 | 3/2018 | Chandra et al. |
| 2018/0174290 A1 | 6/2018 | Yoshida et al. |
| 2018/0284741 A1 | 10/2018 | Cella et al. |
| 2019/0128690 A1 | 5/2019 | Madsen et al. |
| 2019/0317243 A1 | 10/2019 | Xiang et al. |
| 2019/0320574 A1 | 10/2019 | Andrejuk et al. |
| 2020/0019174 A1* | 1/2020 | Cheriton ............... B60W 30/09 |
| 2022/0163436 A1* | 5/2022 | Lopez-Cuervo Medina ............... G01N 33/24 |
| 2022/0243575 A1* | 8/2022 | Kristensen ............. G06F 30/28 |

OTHER PUBLICATIONS

European Search Report issued for European Priority Application No. 19208122.2, mailed May 19, 2020.
European Search Report issued for European Priority Application No. 20172320.2, mailed Oct. 9, 2020.

* cited by examiner

SYSTEM FOR MEASURING AND INTERPRETING A FORCE

This application is a national phase of International Application No. PCT/EP2020/081337, filed Nov. 6, 2020, and published in the English language, which claims priority to European Patent Application No. 19208122.2, filed Nov. 8, 2019, and European Patent Application No. 20172320.2, filed Apr. 30, 2020, each of which is incorporated herein by reference in their entirety.

1. FIELD OF THE INVENTION

The present invention relates to a system for measuring and interpreting a force of a working implement acting on an agricultural field. The user of the system can derive valuable information from the force measurement and force interpretation and can optimize his production. The present invention also relates to a system for controlling agricultural operations of a working means acting on an agricultural field. The user of the system can derive valuable information from optical measurements and optimize his or her production.

2. PRIOR ART

In the prior art there have already been attempts to measure a force of an agriculture working implement.

For example, the document EP 3 420 787 A1 discloses a method for controlling operation of an agricultural system, comprising a tractor and an implement hitched through a draw bar to the tractor. The draft force applied to the implement is determined by a sensor and used for the control of the working implement such that its working tools engage or disengage from the ground and/or the agricultural product.

A similar control of the raising and lowering of a hitch on a vehicle is known from the prior art document U.S. Pat. No. 8,406,966 B2.

Reference document US 2018/0068416 A1 discloses a system, wherein video data captured from an aerial vehicle (AV) is compressed into an aerial orthomosaic overview of an area. The orthomosaic may then be processed in combination with sensor values, measured by sensors sparsely deployed in the area, to generate precision maps for the entire area, including areas in which no sensors are deployed.

Further, reference document EP 0 857 325 B1 discloses an unmanned agricultural vehicle, wherein a monitoring system of the vehicle is provided with sensors on both sides of the vehicle close to the front and rear sides and in the center thereof and with the aid of which the distance to the ground can be measured, in that the monitoring system is provided with a computer which, after receiving signals from the sensors, is designed to transmit via the transceiver-installation a signal to a mobile transceiver-installation of a supervisor if the measured depth deviates from a required depth.

Thus, force measurements at agriculture implements are mainly done to automatically control the working implement. However, there is a need for a system that measures and interprets a force of an agriculture implement for other purposes, for example for analyzing the soil of the agricultural field. Further, although some employments of optical systems in agricultural applications are known, there exists the need for a system that allows an enhanced optical spatial mapping to improve an agricultural operation.

3. SUMMARY OF THE INVENTION

The present invention proposes a system for measuring and interpreting a force according to claim 1.

Particularly, the present invention proposes a system for measuring and interpreting a force, the system comprising at least one working implement, for acting on an agricultural field, at least one force sensor, for measuring a force of the working implement, a position unit, for determining the position of the working implement, wherein the positioning unit comprises a receiver for providing position data, a data memory unit, for receiving the force data from the at least one force sensor and position data from the positioning unit, a data interpretation unit, for interpreting the force data in relation to the position data, wherein the data interpretation unit calculates an interpretation of the measured force; wherein the data interpretation unit comprises a machine learning unit that calculates the interpretation of the measured force.

For example, the measured force may be a draft force of the working implement or a longitudinal force or momentum measured on a part of the working implement. For example, the working implement may be a plough, a cultivator, a disc harrow, a packer, a roller, a chopper, a seed drill, a disc spreader, a sprayer, a mower, a rake, a tedder, a round bale wrapper, etc.

The system according to the invention correlates a force measurement of a working implement with position data obtained by a receiver, to be able to provide information about the agricultural field itself. Further, the data interpretation unit interprets the force data such that the user is assisted in assessing field conditions, abnormalities of the field, unexpected deviations or other events of interest. Thus, due to the interpretation the user must not interpret the raw force data as measured by himself, which is cumbersome, difficult or even impossible. Further, the system for calculating an interpretation of the measured force uses a machine learning unit that improves itself during use. Thus, the interpretations of the force measurements are becoming better and better over time.

Preferably, the system further comprises a display means, for displaying at least the calculated interpretation of the measured force to a user, and an input means, for allowing the user to input confirmation data for at least confirming and rejecting the interpretation of the measured draft force, wherein the machine learning unit of the data interpretation unit calculates the interpretation of the measured force based on confirmation data input by the user via the input means. Thus, the user has the possibility to confirm an interpretation of the measured force, if the interpretation is correct or the user can reject the interpretation of the measured force, if the interpretation is incorrect. This user input trains the machine learning unit, such that it improves the reliability of the interpretations. Such user input can for example be done directly when the user uses the working implement on the field, e.g. during ploughing. Then the user can directly "label" or explain to the system an abnormality of the force measured. However, a user can also provide his input at a later point in time, e.g. when analyzing the measured data after work, at a different site, or even at the site of the manufacturer of the working implement.

Preferably, the data interpretation unit further comprises a monitoring unit that calculates a prediction of the force based on the previously collected force data, compares the actual measurement of the force with the prediction of the force, and generates an alert, when deviations occur between the actual measurement of the draft force and the prediction of the force. Thus, the system can calculate a prediction of the force and can output an alert based on historical data and can inform the user that a deviation occurred. Thus, the user can be informed immediately when the system notices an event that causes a relevant deviation of the measured forces such that he can immediately perform counter measures.

For example, the user can be informed by the system that the ploughing force suddenly increased, what may be the case if a large stone is lying on the field. If, however, the ploughing force suddenly drops this may be an indication of a defect of the plough or an abnormality of the field, like a sand patch or the like.

Previously collected draft data and other data from plough and tractor and $3^{rd}$ party sources can be used to train the machine learning unit. The output of the machine learning unit, for example an algorithm to predict force, may be used by the monitoring unit. Thereby, the dataset used to train the learning system is not limited to just a draft force. The more data is available, the better the prediction will be.

The comparison of the actual measurement of the force with the prediction of the force may allow to predict numerical values, such as expected force magnitude, and also discrete events, such as stone detection.

Preferably, the monitoring unit provides the interpretation of the force deviation to the user, preferably via the display means.

Preferably, the system further comprises a map unit, that provides graphical map data of the agricultural field, wherein map data is shown to the user via a display means together with the force data and/or the interpretation of the measured force data. Thus, the system provides an overview, preferably a graphical overview, of the measured force in relation to the location on the field where this force was measured. Thus, the user can graphically see, where the measured force changed and can draw conclusions from this information.

Preferably, the data interpretation unit provides the interpretation of the measured force based on standardized descriptors of field features and/or of parameters. Thus, the measured force is analyzed by the data interpretation unit dependent on standardized descriptors that are for example based historical data and data or force patterns of typical occurring events and is, therefore, able to provide reasonable interpretations of the force data.

Such descriptors may for example describe a stone on the field, a sand patch, a defect of the working implement, like a puncture of a tire, a change in the overall soil condition, like looser soil, or a wrongly set working implement or an unintended change of the working implement's setting.

Preferably, the machine learning unit of the data interpretation unit comprises a neural network. A neural network can be automatically set up and trained during use. Thus, it improves its force interpretations over time.

Preferably, data interpretation unit calculates different interpretations of the measured force and assigns probabilities to the calculated interpretations. The user can then be provided with more than one interpretation of the force measurement. Thus, even if the most probable interpretation may not be true, the user has the opportunity to confirm the second or even less probable interpretations for training machine learning unit in order to label a certain event of the measured force.

Preferably, the display means is arranged on a driving means that drives the working implement, wherein the user is able to see the display means while driving the driving means and/or is arranged at a remote location. Therefore, the user, i.e. a farmer, can for example immediately see the measured data and the interpretation of the force data when working the field and can associate such interpretation to a certain event or feature of the field. On the other hand, the measured data and the interpretation of the force data can also be shown and evaluated at a remote location. This is particularly useful in case of an robotic or autonomous working implement or when the driving means is autonomous and has no driver or user on-board.

Preferably, the input means is arranged on a driving means that drives the working implement, wherein the user is able to input confirmation data while driving the driving means and/or is arranged at a remote location. Therefore, the user can for example immediately confirm or label a certain event or feature of the field or soil when working the field. On the other hand such confirmation or labeling of an event or feature of the field or soil can be done at a distant location, i.e. at home or at the site of the manufacturer of the working implement.

Preferably, the system further comprises an input means for allowing the user to manually signalize an event, wherein the data memory unit further stores an event indication that is associated to the data stored at the time of signalization. Thus, the user can signalize an event to the system, such that the data recorded is associated to this event. This allows later on to review the measured data, particularly the force data but also other recorded data at the time of the event more closely. Preferably, the input means can be simply a button, i.e. on the touch-display or a separate button, that the user presses, when he is aware of an unusual condition, particularly during working a field. Preferably, then the recorded data is flagged by the event indication to identify it as of particular interest or importance.

Preferably, when the user signalizes an event a sound recording may be started by the system such that the user can easily record further information or explanation regarding the event.

Preferably, the user may also be able to input text via the input means, for example via a touch-display, and/or to record a digital photo via a camera to further information or explanation regarding the event.

Preferably, the input means may be a mobile phone connected to the system via a wired or wireless connection, i.e. WLAN or Bluetooth.

Preferably, after the event is signalized, the data memory unit or the data interpretation unit adds the event indication to data from a specified timeframe before the event and to data of a specified timeframe after the event. Thus, preferably all data around the event is flagged by the event indication to identify it as of particular interest or importance, to become a full picture of the event's data. For example, the data 3 seconds prior and 10 seconds after the event may be flagged as data of the event. Such timing may vary according the events envisaged and working implement used.

Thus, a labelled dataset is of a certain duration before and after signaling is provided, that has a certain label assigned to it, wherein the assignment is done by the user. For example, such label can be "collision with large stone", "loose part fell off", "puncture in tire" or the like. This data can also be used to train the learning system, so eventually it can detect this event automatically, or it can be used as an automated report to service department of the manufacturer of the working implement for manual investigation.

Preferably, the data memory unit further stores data obtained from a driving means that drives the working implement, and the data interpretation unit uses this data for the calculation of the interpretation of the force. Together with the force data and the position data also other data available can be stored for evaluation and interpretation. Particularly, the driving unit, i.e. a tractor or the like, nowadays can provide various data that is of interest for the user and for the interpretation of the force data. Such data can be the actual driving speed, fuel consumption, wheel speed, driving distance, ambient temperature, etc. Further, such data can comprise implement settings, like working width, depth, or other data from the working implement.

Preferably, the system further comprises at least one acceleration sensor arranged at the working implement, for providing acceleration data of the working implement, wherein the data memory unit further stores the acceleration data and the data interpretation unit uses this acceleration data for the calculation of the interpretation of the force. The acceleration data may supplement the force data to better identify certain events, for example hitting a stone or driving over a curb or the like.

The acceleration sensor can be used to provide information about the orientation/tilt of the working implement. The acceleration sensor can be IMU (Inertial Measurement Unit) sensor. Such IMU sensor has multi axis accelerometers, gyroscopes for angular speed, magnetometer for compass heading, internal signal processing, sensor fusion etc. in the same sensor package available for use. Such an IMU sensor thus provides full 3D orientation/angular speeds/heading data that can be stored and/or used by the data interpretation unit.

Preferably, the system comprising at least two draft force sensors, for measuring the draft force required to move the working implement while working the agricultural field. Preferably, the two draft force sensors are arranged at the left and right side of the hitch of the working implement or of the hitch of the driving means.

A system for controlling agricultural operations comprises at least one agricultural working means (110) for working on an agricultural field (1100); at least one first imaging device (120) located at the agricultural working means (110) for acquiring images of an environment of the agricultural working means (110), wherein the at least one first imaging device (120) is adapted to provide optical data; a position unit (130) for determining the absolute position of the at least one first imaging device (120), wherein the position unit (130) is adapted to provide position data; a data processing unit (150) comprising a data interpretation unit (151) for interpreting optical data received from the at least one first imaging device (120) in relation to position data received from the position unit (130), wherein the data interpretation unit (151) is adapted to calculate interpretation data based on the received data; a mapping unit (170) for providing a map of data based on the interpretation data, wherein the data processing unit (150) further comprises: a feature detection unit (152) for detecting at least one feature (1110) of an image of the at least one first imaging device (120); a feature location determination unit (154) for locating said detected feature (1110) in the map of data: a feature determination unit (156) for determining attributes of said detected feature relevant for agricultural operation of said detected feature (1110). A respective method of controlling agricultural operations comprises the step of using such a system.

Particularly, the present invention also proposes a system for controlling agricultural operations comprising at least one agricultural working means for working on an agricultural field, at least one first imaging device located at the agricultural working means for acquiring images of an environment of the agricultural working means, wherein the at least one first imaging device is adapted to provide optical data, a position unit for determining the absolute position of the at least one first imaging device, wherein the position unit is adapted to provide position data, a data processing unit comprising a data interpretation unit for interpreting optical data received from the at least one first imaging device in relation to position data received from the position unit, wherein the data interpretation unit is adapted to calculate interpretation data based on the received data, a mapping unit for providing a map of data based on the interpretation data. The data processing unit further comprises a feature detection unit for detecting at least one feature of an image of the at least one first imaging device, a feature location determination unit for locating said detected feature in the map of data, a feature determination unit for determining attributes of said detected feature relevant for agricultural operation of said detected feature.

Thus, an enhanced spatial mapping system for agricultural applications can be provided, wherein respective optical information can be obtained by employment of at least one first optical system and its respective positional data, which aids a user to optimize the agricultural operation. In particular, the position and optical information provided by the at least one first optical device may be combined and this may allow real time operation control, further planning or evaluation of the work performed. A data link may be provided to allow transfer of the respective data, preferably in real time. The combined information may be used for photogrammetry 2D and/or 3D mapping of the surroundings, feature detection, estimation of the work rate, work results, detection of anomalies in the field etc. The map of data map be preferably a graphical map.

An agricultural operation may be for instance a soil working operation or a harvesting operation. The agricultural working means can also be any agricultural tool, like for example a cultivator, a disc harrow, a packer, a roller, a chopper, a seed drill, a disc spreader, a mower, a rake, a tedder, a round bale wrapper, etc. The at least one first imaging device may comprise one or more of a digital camera, an NDVI camera, a LASER device, a LIDAR device, a LEDDAR device, a light sensor, a color sensor and/or any suitable other optical sensing methods. The information from different sensors may be used in combination with imaging data acquired thus allowing complex data acquisition which may enhance the characterization of the area detected. Data storage during working operation may be allowed for any data obtained by the employed sensors. Accordingly, each data sample/image frame may be provided with a synchronized timestamp and position available for post viewing or further processing. It may also be possible to view and playback any data from a work session, which may include sensor data, optical images such as for instance raw footage and data relating to detected or labelled features, which may be used for further post processing work. This may be performed by transferring the data via cloud to a remote location. For example a user may be enabled to click on the map at a certain location of a detected feature such as for instance a stone and it may be possible for the user to get the graph of for instance of a draft force measured by respective sensors at that location at the time window of passing the feature, which can be for instance indicated by a data peak on a graph.

The information from different sensors at and/or for the agricultural implement may be used in combination with imaging data acquired thus allowing complex data acquisition which may enhance the characterization of the area detected. For example, one or more force sensors at the connection between the agricultural working means and agricultural implement for measuring the actual draft forces for the actual agricultural operation can be provided. Alternatively or additionally, force sensors at the agricultural implement could be provided that measure forces by elements of the agricultural implement, for example force sensors at individual plough shares, when working the soil, mowing, spreading seeds, etc. Other sensors can measure the humidity of the soil, the nutrient content of the soil, soil thickness, soil consistency, etc. A draft force required for drafting or dragging an agricultural implement of the agricultural working means may yield additional information that is useful for the system that cannot easily be obtained from image data. For example, the system may be able to classify a geographic object as soil based on the image data. The drag force required for drafting an agricultural implement of the agricultural working means may allow determining the degree of compaction of the soil.

In the present invention the data of for instance optical sensors as well as other sensors may originate from several independent units, for example tractor, implement, drone, camera, mobile, GPS unit etc. To synchronize time of all measurements, the present invention may encompass means for providing a global and common clock time base which may be used to timestamp all data samples and images. This may require a common global clock or timing unit which may be accordingly provided with the present invention such that it may be ensured that all data (both optical and other sensor data) can be synchronized and placed accurate on a common timeline. Similarly, the position unit may ensure that all optical and other sensor data could be placed on the correct location on the map. Clock unit and position unit may be provided as the same unit or can be provided as separate units.

The potential further sensors may be adapted to acquire a complex map in real time. However, also playback post work operations potentially at a remote location may be allowed. The position unit may further comprise a position determination unit, which may be an integral or separate part of the position unit and which may be a receiver, such as a satellite receiver for exchanging data with a global positioning system and in particular a GPS receiver. This may provide absolute or relative position data of any part of the disclosed system, for instance the agricultural working means and the at least one first imaging device. The position determination unit may also be provided separately from the position unit and adapted to transfer its position data to the position unit in a suitable manner. It is noted that a unit within the context of the present invention should be understood as any kind of suitable hardware and/or software means, which would allow providing the described functionality.

It should be understood that the at least one first imaging device may be attached or mounted to an agricultural working means in a way that allows an adjustment (movement, rotation etc.) with respect to the agricultural working means in any desired direction to acquire an image for instance from different acquisition angles or positions. The at least first one imaging device can be an integrated tractor or implement camera system which may be factory fitted or just a smart phone in a dedicated holder, or a consumer camera on a tripod or a third-party camera mounted to a tractor and/or an implement. The at least one first imaging device may also be arranged in a remote manner to the agricultural working means and thus not attached to the agricultural working means.

The system according to the invention may allow for a correlation of the optical measurements by the imaging device and a combination with corresponding position data to provide exact spatial information of the agricultural field on which the agricultural operation is performed. In particular, it may allow for a spatial representation obtained by images taken from different positions and/or acquisition angles. Thus, a more sophisticated way of providing spatial information can be provided by the system according to the present invention. The interpretation of the combined image data and position data can be used to better identify and localize features of interest in the agricultural field, which may be inspected further, to allow performing agricultural working tasks in an optimized way, for example in the economically best way, wherein for instance a fuel consumption versus time is optimized.

The data interpretation unit may interpret the optical data such that the user is assisted in assessing field conditions, abnormalities of the field, unexpected deviations or other events of interest. Thus, due to the interpretation, the user may not need to interpret the raw optical data of the imaging device by him—of herself, which is cumbersome, difficult or even impossible. Further, the data interpretation unit provides the advantage of combining optical data of one or more first imaging systems, which may acquire images from different positions, different altitudes and/or angles and may even further allow a combination with the position data of the respective first imaging devices to create a combined graphical information, such as in form of a map. This map may be combined with further data, for instance information of a driving means used for the agricultural operation, such as present fuel consumption during a ploughing operation, which may allow for a prediction of the estimated total energy/time needed for the whole field after ploughing just a few passes, etc. In other embodiments the system may predict a distance, a slip, a mechanical work, an efficiency, a power use, fuel consumption, etc. The mapping unit may provide the information as any suitable 2D or 3D map representation or any further suitable representation. That is some sensor data may be suitably presented as a graph timeline, such as for example force measurements. Thus, the mapping unit may provide both respective maps and graphs etc.

Basically, the feature detection unit may allow a detection of anomalies in an agricultural field or any other feature of interest that can be optically determined. The feature determination unit may be set up to identify only certain predefined desired features and/or may be set up identifying any irregularities occurring in the acquired images and/or the map of data. Also, the spatial extension of the respective features may be determined by the optical data obtained. The spatial characterization of a feature may also be performed at the feature location determination unit and/or the feature determination unit. The feature location determination unit may allow to characterize a location of the features considering the position information of the respective imaging device. The feature location determination may provide an absolute positional information or relative positional information of a feature, such as its distance to the agricultural working means. This may allow for a controlling action of the driver in reaction to said information, for instance, if the driver would precisely see whether he hits an upcoming obstacle with the tractor or an attached working implement or not and thus whether he must evade or not.

The feature determination unit may characterize an identified feature by its attributes and thus allows to characterize it in further detail. Said attributes may include color, texture and form information, which may be used alone or in combination to identify any suitable physical, chemical or further attributes of interest that may characterize the feature. For instance, it may be determined whether an identified obstacle in the field is a stone or an animal or it may be determined whether certain agricultural crops are ripe for harvest or not, which would accordingly allow a user to take appropriate action.

Further, the information about the features may be provided to a user in form of acoustic information instead of or in addition to the optical information, which may allow a user to react immediately, for instance to a potential danger. Said reactions, which may include acceleration, slowing down or change in movement direction of the agricultural working means can also be induced in an automatic manner, without any manual user input.

Further, the data processing unit may comprise at least one machine learning unit that calculates the determination of the features, which were optically detected. The machine learning unit may use known machine learning methods. Such machine learning methods may comprise supervised learning, unsupervised learning, reinforcement learning and neural networks/deep learning. Thus, the machine learning unit may use different machine learning tools to comply with different situations. Any of the above steps could also be implemented at a remote location such as by cloud computing.

Preferably, the system further comprises at least one second imaging device not located at the agricultural working means in addition to or instead of the at least one first imaging device, wherein the at least one second imaging device not located at the agricultural working means is adapted to provide optical data and is adapted to be located above the agricultural field at an altitude for acquiring images of an area below the at least one second imaging device not located at the agricultural working means, and wherein the position unit is adapted to determine the absolute position of the at least one second imaging device.

Any features explained above with regard to the at least one first imagining device, such as for instance control, acquisition or data processing, may correspondingly apply for the at least one second imaging device. Thus, according to the present invention, an improved feature recognition can be provided, wherein the images taken by multiple optical first and second devices improve the feature determination, which may not be obtained with just a single system or a system that does not provide combined optical information. In particular, the use of multiple imaging devices may allow for a precise spatial determination. For instance, a spatial planar extension with respect to the agricultural field and a respective height of a feature, such as a stone or crop to be harvested may be determined to obtain a precise 3D-extension by combining the optical information of the at least one second imaging device, which may acquire top view images of said feature with optical information of the at least one first imaging device, which may be arranged at a lower altitude and may be adapted to acquire side view images of said feature. This may allow for a precise spatial feature extension determination which may not be accurately performed by using just a single imaging device.

The at least one second imaging device may be not attached to the agricultural working means and may be thus arranged in a remote manner, wherein a respective movement, such as a translation or rotation may be allowed by respective means. Control of the at least one first and the at least one second imaging devices such as movement, orientation and image acquisition configuration may be performed manually or in a fully automated manner. Also, the at least one second imaging device may be embodied as a handheld smart phone or other handheld consumer camera or any other suitable image acquisition means known to persons skilled in the art.

Preferably, the data processing unit is adapted to combine the received optical data and the received position data to obtain a combined map of data and further to include the determined features to the map of data to obtain an enhanced combined map of data comprising location and attributes of the determined features.

This may allow for a full graphical representation of the agricultural field including all relevant features that may impact the agricultural operation. Accordingly, not only a 2D or even 3D representation of the agricultural field but also respective determined features may be provided containing relevant information for performing the agricultural operation in an optimized manner. Accordingly, a corresponding digital twin of the agricultural field imaged may be formed. Thus, an agricultural analysis tool may be provided which can be used at remote location to plan and monitor each unique field over time. For example, said tool may be updated each year when ploughing or other agricultural operations on said agricultural field are performed. In the case a drone is employed for the imaging device, this may allow to schedule an extra drone fly over and to collect new data, such as current crop height in between the actual operations. Further, already identified fixed obstacles may not need to be mapped each time as they are already detected and identified and/or localized.

Preferably, the data processing unit comprises at least one machine learning unit and an input means for allowing the user to input confirmation data for at least confirming and rejecting the interpretation of the interpretation data, wherein the at least one machine learning unit of the data processing unit calculates the interpretation of the optical data based on confirmation data input by the user via the input means.

Thus, the user has the possibility to confirm an interpretation of the optical data, if the interpretation is correct or the user can reject the interpretation of the optical data, if the interpretation is incorrect. This user input trains the at least one machine learning unit, such that it improves the reliability of the interpretations. Such user input can for example be done directly when the user uses the agricultural working implement on the field, e.g. during ploughing. Then the user can directly "label" or explain to the system an abnormality of the optical data. However, a user can also provide his input at a later point in time, e.g. when analyzing the measured data after work, at a different site, or even at the site of the manufacturer of the working implement.

Preferably, data processing unit is adapted to be provided on the agricultural working means and the system further comprises a further data processing unit for providing processed data, wherein the second data processing unit is adapted to be provided at a location remote from the agricultural working means.

The data processing unit and the further data processing unit may be in a remote connection, which allows data exchange between said first and second processing units. Also, it should be understood that any data processing of the system of the present invention may also be implemented by respective cloud computing means and that the respective parts of the system are accordingly equipped with suitable means that allow a respect data exchange, in particular in real time.

Preferably, the at least one first imaging device is adapted to be located at a bottom height, wherein the bottom height is the altitude of the at least one first imaging device to the surface of the agricultural field and allows detecting bottom altitude detectable features and/or wherein the at least one second imaging device is adapted to be located at a selected one of three different altitudes, namely a low altitude, which is higher than the bottom altitude and allows detecting low altitude detectable features, a medium altitude which higher than the low altitude and allows detecting medium altitude detectable features and a high altitude which higher than the medium altitude and allows detecting high altitude detectable features.

Thus, it may be allowed to define specific altitudes, wherein certain features are expected to be optimally investigable. Thus, a determination of a plurality of features, which may not be determinable or even identifiable at only one altitude may be allowed. The at least one second imaging device may also be adapted to be located in more or less than the above noted three altitudes, such as only one altitude or four or more altitudes.

Bottom altitude detectable features may comprise crop height, color variations for (even single) crop plants and the condition of the agricultural working means, soil and crop root characteristics.

Low altitude detectable features may comprise uniformity of soil work, straightness and uniformity of furrows, uniformity of furrow ends, agricultural working means dimensional settings, drift at slopes, coverage of vegetation, obstacles, wheel tracks, wet or dry patches, patches of vegetation or missing vegetation and animals, vehicles, machines, implements, robots or people in the field. Further low altitude detectable features may include vegetation index, weed patches, height of weeds, crop or grass, insect infestation, broken parts or abnormalities on the machine, maintenance needing, status of wearing parts. The system according to the present invention may also be provided with optical systems using wavelengths different than visible wavelengths, such as for instance infrared wavelengths, which may allow the detection of further features detectable by said respective different wavelengths.

The present system accordingly allows determining features, which may not be determinable by a single system in the prior art. For instance, when ploughing a furrow, the system may allow for analyzing any upcoming issues that may occur in the upcoming furrow. Further, the system may allow to determine whether obstacles such as stones are present upstream of the working operation, for instance at the turning points of a tractor and the respective sizes of said obstacles. Also, the system may allow an optical detection downstream of the working operation, for instance regarding a determination of stone releases, and may for instance allow for an examination of the quality of ploughing by estimation of vegetation after ploughing. Further, the system may allow to track moving objects at close distance such as animals, people, vehicles etc. Further, the system may allow detecting uniformity of an agricultural work, such as furrows or furrow ends and may accordingly allow the detection of any uneven results. Even more it may allow the estimation of the position of the tractor and an attached agricultural implement and if a tractor turns out of the furrow. Even further it may allow the estimation of the speed of the agricultural working means. Even further, it may detect if a drift for instance at slopes is present. Thus, also the yaw angle of a working implement may be adjusted accordingly. Also, the system may allow detecting any anomalies occurring at the working means itself, for instance any misfunctioning, lose or broken parts thereof. Thus, a real time determination of the quality of the agricultural work performed may be established and a user may be supplied by this information, preferably in real time, allowing him or her to take appropriate action. Of course, many other features to be detected may be envisioned by a skilled person, which may help to improve the agricultural operation. Medium altitude detectable features upstream of the agricultural operation may comprise straightness of furrows, wet patches and colour variations of an agriculturally operated field. High altitude detectable features may comprise homogeneity of the worked field, agricultural working means movements also on multiple fields, agricultural work control or color variation in a large area.

Locating the at least one second imaging devices in higher altitudes may allow that certain features, such as a straightness of furrows may be investigated for a larger area.

Even further, a better overview of the detected area may be obtained and certain features, which may not be detectable in a bottom or low altitude, could now be investigated in the medium and/or high altitude. This may also include detecting larger irregularities or color variations in the field that may be based on wet patches or ponds and the detection of old driving patterns. Said information may also be used to inform a user about upcoming obstacles and may allow for a route planning around said obstacles. Even further, the location in a high altitude may allow the detection of multiple agricultural fields at the same time and thus a user may be enabled to control and plan the present agricultural operation for a whole fleet of agricultural means to optimize a rate of work or a progress. Also, the system may allow to be shared between multiple users, such as multiple farmers owning neighboring fields, on which it may be worked in parallel. Herein, zooming in for image detection and/or changing altitudes may be alternately performed, for instance by lowering the altitude, dependent on the need of the respective multiple users. Even further, particularly for high altitude images, the images may be combined with third party data sources, for instance NDVI, moisture data, weather radar images, satellite data etc., which thus allows generation of further synergies regarding an optimization of the agricultural operation. On cloudy days for instance, a drone, which may be employed in the system according to the present invention comprising a respective imaging device and the correct type of sensors, could compensate for any clouds that may interfere with satellite images, thus adding missing data.

Preferably, the at least one second imaging device is adapted to be located based on a request for determining a detected feature in the selected altitude.

The request for determining an identified feature may be a manually induced user request or may be an automatically induced request. Hence, a user may select whether he wishes further information about a certain feature or not. Also, he may select to change altitude to determine a certain feature, which may not be determinable in the present altitude. If a feature is not determinable in the present altitude, the system may automatically change to another altitude, for instance a lower altitude, to further determine the identified feature in greater detail. The altitude may be for instance selected based on the known size of the field to be investigated. Herein, larger fields may be investigated at a higher altitude for obtaining a full-field picture, while smaller fields can get be investigated from a lower altitude.

Preferably, the agricultural working means comprises a driving means for driving the agricultural working means, and/or an agricultural working implement attached to the driving means.

For example, the driving means can be a tractor and the working implement may be a plough, a cultivator, a disc harrow, a packer, a roller, a chopper, a seed drill, a disc spreader, a sprayer, a mower, a rake, a tedder, a round bale wrapper, etc. The position unit and/or the position determination unit may be arranged at any suitable position on the agricultural working means, such as on the driving means or the agricultural working implement connected to the driving means. For the case that a misfunction of the agricultural working means occurs, an emergency system may be implemented, which may allow to report on the position of the respective malfunctioning means that may also be shown on the map. This may facilitate the localization of a malfunctioning means. The agricultural working means may also comprise a robot or autonomous implement.

Preferably, the system further comprises a display device, for displaying the acquired images and/or the enhanced combined map of data to a user, wherein the display device is arranged on the driving means, wherein the user is able to see the display device while driving the driving means; and/or is arranged at a location remote from the driving means.

The display device may be provided as digital screen, which may be arranged on the driving means the user drives during the agricultural operation. The display device may be realized by the screen of a user's mobile phone. Therefore, the user, i.e. a farmer, can for example immediately see the measured data and the interpretation of the optical data when working the field and can associate such interpretation to a certain event or feature of the field and may accordingly react. On the other hand, the measured data and the interpretation of the optical data can also be shown and evaluated at a remote location. This is particularly useful in case of a robotic or autonomous working implement or when the driving means is autonomous and has no driver or user on-board. At a remote location, the user may for instance evaluate the data and interpretation at a later point in time. The display device may allow different visual layers and customized user surfaces for the visualization of the map and other data and interpretation, such as characterizing feature attributes. In this way the user can view the data from different perspectives, helping the user to take a decision or to get further insights. The user may select different predefined filters of different signal processing/mathematical functions to the data, so the user can view the data from different perspectives. Preferably, the user may also be able to input text via the display, for example via a touch-display, and/or to record a digital photo via a camera to further information or explanation regarding an event or feature. Preferably, the input means may be a mobile phone connected to the system via a wired or wireless connection, i.e. WLAN or Bluetooth.

Preferably, the system further comprises an operation input controller for controlling the agricultural working operation, wherein the operation input controller is arranged on the driving means, wherein the user is able to perform inputs while driving the driving means; and/or is arranged at a location remote from the driving means.

The operation input controller may control the agricultural working operation based on a manually induced input or an automatically induced input. The operation input controller may comprise one or more buttons, touchpads, joysticks or the like. Preferably the operation input controller may be combined with the display device in the form of a separate touch-screen or may be realized by a mobile phone. Further the input means may be an acoustic input means that uses a microphone and an appropriate processing means for voice recognition. Thus, the user may input information orally, which is particularly useful when driving the driving means. A user may for example immediately react on a certain event or feature of the field or soil when working the field. On the other hand, such reaction may be done at a distant location, i.e. at home or at the site of the manufacturer of the working implement.

Preferably, at least one of the following components is comprised in a smartphone: the at least one first imaging device, the at least one second imaging device, the position unit, the data interpretation unit, the mapping unit, the data processing unit, the further data processing unit, the display device, the operation input controller.

This may allow for a cheap and easy to implement solution of the system according to the present invention, wherein separate expensive special means may be omitted. In particular any camera means and/or means for calculating or interpreting data in the system according to the present invention may be implemented by using a smartphone. Further, also other sensor data for instance from smart phone internal sensors could be added to the data set such as for example speed, orientation, altitude etc. depending on the sensors provided in the smart phone in addition to the camera. This may lead to a system according to the present invention where the smart phone is the only sensing device provided. Even further, also position detection of respective parts of the system of the present invention may be realized by a smartphone, such as for instance via GPS.

Preferably, the data processing unit is further adapted to provide a suggested controlling response based on the determined features of the enhanced combined map of data, wherein the suggested controlling response is provided to a user via the display device, and/or automatically induces a controlling response at the agricultural working means, which is accordingly controlled based on the controlling response.

This may allow a user selecting one out of a group of proposed actions on a detected event. For instance, a user may be provided with one or more selectable options regarding an evasion of an obstacle. Said proposal may be predefined and may be chosen based on an algorithm, which may identify the detected feature and accordingly proposes one or more proper reactions. Said algorithm may also be trained, for instance by machine learning that may be trained by the acquired images and/or a respective user input, for instance as a reaction on a detected event. Thus, use of the system may be facilitated as a user may only decide between few items of a group of proper reactions.

Further, a user may also be able to add new images by using a smart phone via a respective GUI or app. This may allow simply taking a photo of a new or missing feature, which may then be added to the overall dataset and/or map and accordingly labelled automatically or by additional user input or a respective description. This may allow a training of the system based on the user inputs, which accordingly improves the system over time. Also, if the machine learning method employed in the present system is uncertain if the detected feature is correctly determined, the user may be presented with a corresponding input option to confirm or reject the proposed determination of said feature. The system may for instance request a user input if a certainty value for a distinct feature is not reached. Then, the user input may aid in reaching a certainty value such that the system stops demanding a user input for said and similar features in the future. This may allow a training of the system over time. The automatic controlling response may base on the outcome of a machine learning results provided with the present system.

Preferably, the at least one second imaging device is arranged on an autonomous aerial vehicle, wherein the operation input controller includes an autonomous aerial vehicle control, which is adapted to exchange data with the data processing unit, wherein the data processing unit is further adapted, after detecting a feature, to submit a suggested altitude value to the autonomous aerial vehicle control based on the detected feature, wherein the autonomous aerial vehicle control is adapted to move the autonomous aerial vehicle to the suggested altitude value automatically or by user input, wherein the data processing unit is adapted, after the autonomous aerial vehicle has been moved to the suggested altitude value, to perform a feature detection, localization and/or determination automatically or by user input.

The autonomous aerial vehicle, for instance a drone, may be provided with respective light emitting means, such as lamps, and when positioned in a low altitude, said lamps may illuminate the work area upstream of the agricultural working means. The above described system may also comprise a draft force sensor. For example, the measured force may be a draft force of the agricultural working implement or a longitudinal force or momentum measured on a part of the agricultural working implement. Also, further sensors like sensors to acquire tractor and/or implement metrics may be provided in the present system. The sensor data may be linked to time and location data and may be correlated with optical data acquired as also previously described. For receiving and storing any data handled in the system, such as for instance image data from the imaging devices and position data from the position unit and/or characterizing data of attributes of features determined by the processing unit, the system may further comprise a data memory unit that is able to receive and store said data. The data memory unit may be arranged at the driving means, on the agricultural working implement or even be implemented remote in a data cloud. The data processing unit may be arranged at the driving means or on the agricultural working implement. Further, data processing unit and/or data memory unit could be in a remote location where data is sent both ways via telemetry or other mobile data connection. Any potential heavy computation of the system of the system can also be performed at remote location, whereas lighter computation can be done locally for instance at the driving means or agricultural working implement. The system may further comprise at least one acceleration sensor arranged at the working implement, for providing acceleration data of the working implement. Any data transfer connections between respective devices, units or means noted in this specification, can be established in a suitable wired or wireless manner.

The at least one machine learning unit can be automatically set up and trained during use. When several units are provided, they may communicate and exchange data such as raw or labelled data like draft force or optical data with "internal" or "external" machine learning units and be trained for the detection and determination of different objectives such as for instance stones and animals. Thus, as an example a draft force machine learning unit could exchange data with an optical machine learning unit provided in the system and vice versa. Thus, it may improve its force and optical interpretations over time. A trained optical system may be allowed to output its results such as labelled features, for instance a stone, to train a general sensing system for example a force sensing system to interpret sensor readings that correspond to the detected feature at a certain time and location. For example, a stone that is optically identified and labelled as a "stone" could be associated with the force sensor reading at time of passing the stone. This correlation of data can then be used to automatically train how to detect stones from a pure force sensor data set. That is force peaks of certain shape get a label "stone" which can be used for training of a secondary machine learning system for force sensor data. A further benefit may be provided in that other derived agriculture systems that lack optical sensing, but only employ for instance a force sensor could benefit from this training. A trained force detection algorithm may be distributed to these systems and they may accordingly be able to detect pretrained features just by evaluating the force data stream without having an additional optical system. The at least one machine learning unit may comprise a neural network.

The present invention is preferably further directed to a method of controlling agricultural operations by using a system according to one of the preceding embodiments.

3. DESCRIPTION OF THE FIGURES

Figure 2:
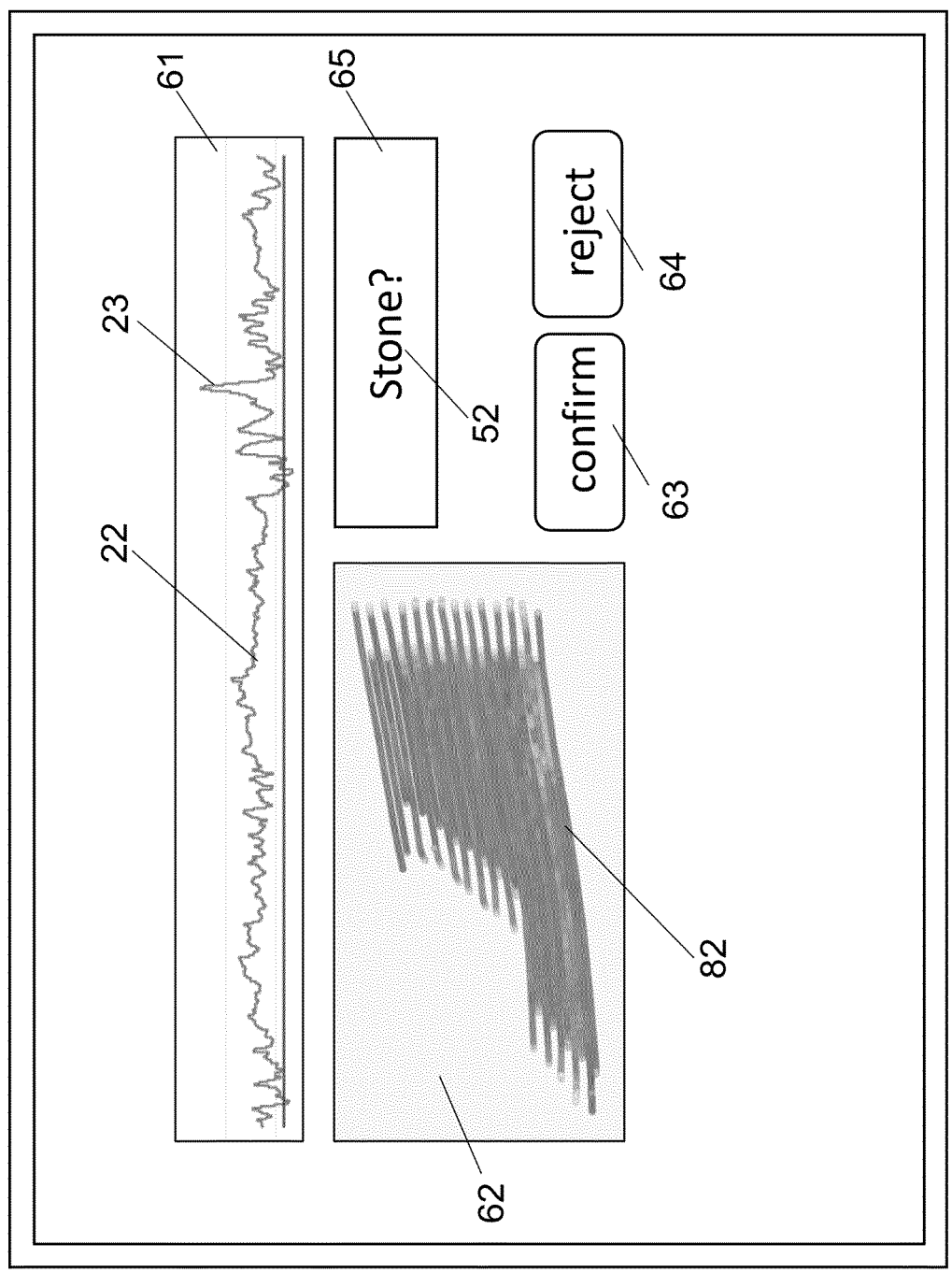
Figure 3:
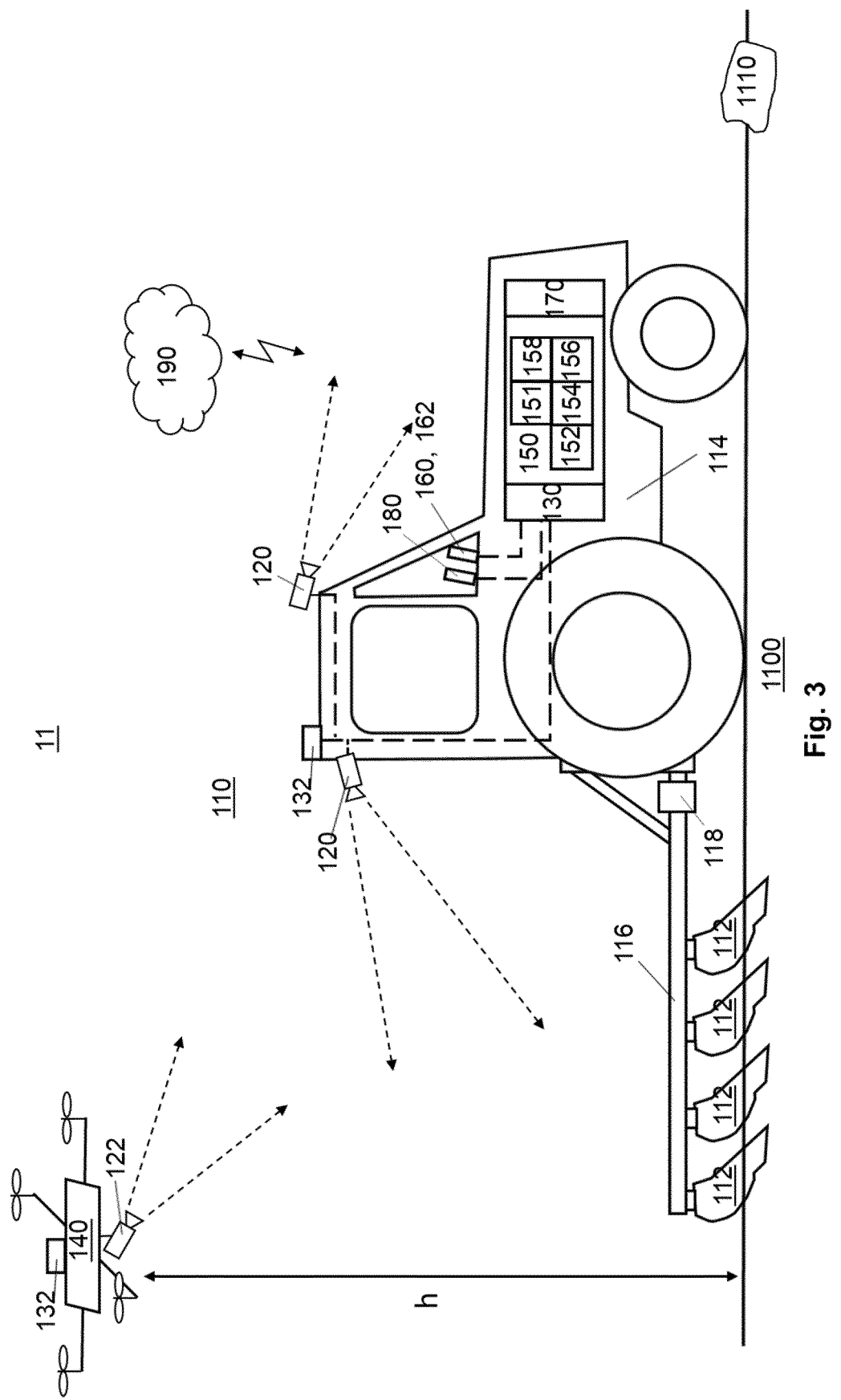

In the following preferred embodiments of the invention are disclosed by means of the figures. In which shows:

FIG. 1: a schematic view of an exemplary embodiment of a system for measuring and interpreting a force;

FIG. 2: a view of a display according to an embodiment of the system of FIG. 1; and FIG. 3: a schematic view of an exemplary embodiment of a system for controlling agricultural operations.

4. DESCRIPTION OF PREFERRED EMBODIMENTS

In the following preferred embodiments of the invention are disclosed by means of the figures.

FIG. 1 shows an exemplary embodiment of a system 1 comprising a working implement 10, a force sensor 20, a position unit 30, a data memory unit 40, a data interpretation unit 50, display means 60, input means 70 and an acceleration sensor 80.

The working implement 10 is in form of a plough 10 connect to a driving means 100 in form of a tractor 10. As shown the tractor 10 is presently ploughing the soil 110 of an agricultural field. However, the working implement 10 can also be any other agricultural tool, like for example a cultivator, a disc harrow, a packer, a roller, a chopper, a seed drill, a disc spreader, a mower, a rake, a tedder, a round bale wrapper, etc.

The force sensor 20 is attached to the working implement 10 or to the driving means 100 in the area of the hitch. Preferably, the force sensor 20 measures a pulling force or draft force required to move the working implement 10. However, the force sensor 20 could also measure a longitudinal force or momentum on a part of the working implement 10, for example at one or all of the plough shares 12.

The position unit 30, determines the position of the working implement 10. The positioning unit comprises a receiver 32 for providing position data. Preferably, the receiver 32 may be a satellite receiver, for example a GPS receiver. As shown the position unit 30 and the GPS receiver 32 can be arranged at the driving means 10, which in most cases provides exact enough data for determining the position of the working implement 10. However, the position unit 30 and the GPS receiver 32 may also be arranged on the working implement 10.

For receiving the force data 22 from the at least one force sensor 20 and position data from the positioning unit 30 and for storing such data the system 1 further comprises a data memory unit 40. Like the position unit 30 the data memory unit 40 can be arranged at the driving means 10. However, it may also be arranged on the working implement 10. Further the memory unit 40 may be implemented by a data cloud.

The data interpretation unit 50, interprets the force data 22 in relation to the position data, wherein the data interpretation unit 50 calculates an interpretation of the measured force 52. For doing so the data interpretation unit 50 comprises a machine learning unit 54 that calculates the interpretation of the measured force 52. As shown in FIG. 1 the data interpretation unit 50 can be arranged at the driving means 10. However, it may also be arranged on the working implement 10.

Further, data interpretation unit 50 and/or data memory unit 40 could be in a remote location where data is sent both ways via telemetry or other mobile data connection. In an embodiment the machine learning unit 52, which may be the brain of the system 1 may require heavy computation, is at remote location, whereas lighter computation can be done locally at the driving means 100 or working implement 10.

There are two main methods to train the machine learning unit 52:
(A) In a local training "on the go" while ploughing and figuring out the expected normal condition or unexpected special events. This can be done automatically or by a user confirmed hypothesis in form of an interpretation 52.
(B) By remote training by incorporating all data sets available for all machines. This may comprise to collect force data and other data and send it to remote location for training. This is centralized training and typically done remote due to big data processing power needed. Typically, the results of training will then be available at a later point in time, not directly "on the go" as by method A. The training is preferably based on data collection from manual operations over time worldwide, and creates a more comprehensive machine learning system.

The machine learning unit 54 can use known Machine Learning (ML) methods. Such machine learning methods may comprise supervised learning, unsupervised learning, reinforcement learning and neural networks/deep learning. Thus, the machine learning unit 52 can use different ML tools to comply with different situations. For example detecting a stone impact would require different ML methods than predicting the actual numerical value draft force value ahead of time.

Apart from force data interpretation by machine learning in the machine learning unit 54 the data interpretation unit 50 may also perform other numerical calculations to the measured data. Such calculations may comprise statistical calculations, like averaging, pre-filtering, low pass filtering, differencing of two signals, etc. of the measured data. Such calculations can be implement in a standard machine controller, and are preferably applicable in the monitoring unit 56, for informing user of the machine state. Every time the set time interval lapses, a recalculation is made, and the user gets updated on the calculated predictions. Additionally, these prediction values can be provided to the machine learning unit 54, too, so that it can be taught to predict changes, detect abnormalities etc. in these slowly changing prediction values. Thus, the machine learning unit 54 could learn to predict on different base data, with different update rates, which may all originating from same raw data stream: In a "slow-rate-data learning mode" it may learn based on slow changing average value data. For example, it may predict the estimated total energy/time need for the whole field after ploughing just a few passes, etc. In other embodiments the system may predict a distance, a slip, a mechanical work, a efficiency, a power use, fuel consumption, etc.

In a "normal-rate-data learning mode" it may learn based on higher frequency data. For example, it may learn to interpret stone impact peaks that can be only seen in the high frequency force data stream, etc.

The display means 60 can be provided as digital screen. It can be arranged within the driving compartment of the driving means 100 such that the user can directly see the measured force data 52 and/or interpretation of force 52, as shown in FIG. 2. The display means 60 can, however, be also at a remote location for the user to evaluate the data and interpretation 52 at a later point in time. The display means 60 can also be realized by the screen of a user's mobile phone.

The input means 70 can comprise one or more buttons, touchpads, joysticks or the like. Preferably the input means 70 is combined with the display means 60 in the form of a separate touch-screen or realized by a mobile phone. Further the input means may be an acoustic input means that uses a microphone and an appropriate processing means for voice recognition. Thus, the user may input information orally, which is particularly useful when driving the driving means 100.

The acceleration sensor 80 is preferably arranged at the working implement 10 for measuring accelerations of the working implement.

FIG. 2 shows an exemplary display means 60 that presently shows in window 61 a graph of the force 22 over the time. The graph is preferably updated constantly when new force data 22 is measured. The force 22 in the shown example corresponds to the draft force during a ploughing operation. However, the invention can also applied to any other working of the field, and also a transport and a turning of the working implement 100 in lifted position.

The display means 60 may allow different visual layers and customized user surfaces for the visualization of the force 22 and other data and interpretation 52. In this way the user can view the interpretation 52 or data from different perspectives, helping user to take a decision or to get further insights. The user may select different predefined filters of different signal processing/mathematical functions to the data, so the user can view the data from different perspectives. For example, the user can select a "high draft" filter, that will highlight the peaks 23 of the draft force on the map 82 and/or the graph 22.

In window 62 the display means 60 shows map data 82 of the field. The map data 82 preferably comprises traces 82 of the previous working task. The map and the traces 82 are generated by a map unit 80 that obtains position data from the position unit 30. The traces 82 are preferably differently colored according to the force 22 measured at the actual position of the working implement 10 at the time of measuring. Thus, from the map data 82 the user may see deviations in the force depending on the location on the field and may draw conclusions from the force distribution.

Window 65 shows interpretations 52 of the measured force, that are calculated by the data interpretation unit 50. In the shown example the system 1 determined that the recently measured force 22 may indicate a stone on the field. This interpretation may be derived by the data interpretation unit 50 from the shape of a characteristic peak 23 of the graph of the force.

After the interpretation 52 is shown to the user, it can use the touch screen buttons 63 or 64 to confirm the interpretation 52 or to reject the interpretation 52. This user input is used to train the machine learning unit 54, which may comprise a neural network, to become better over time. Thus, over time the interpretations 52 of the data interpretation unit 50 is becoming better and better, such that the system 1 interprets the measured data with a higher certainty.

Some machine learning by the machine learning unit 54 could be done without user input. This is dependent on the machine learning methods used. For example, unsupervised learning does not require a user confirmation. Thus, the system 1 can comprise built in predefined interpretations that are applied to the measured data without user confirmation needed. For example, by an all stone-detection-training the system 1 learned to detect a stone with a certain acceptable probability. Then this stone detect algorithm can be built into a future version of the system and no longer requires confirmation from user each time this event occurs. It is important to allow the machine learning unit 52 to evolve and become smarter as time goes. Then new challenges can be given to the system 1 that again require to ask the user for confirmation to allow learning.

This interpretation 52 of force data can be used to identify and localize different soil conditions, special features of the field that should be inspected further, to perform agricultural working tasks in an optimal way, for example in the economically best way, where e.g. time versus fuel consumption is optimized.

The preferred embodiment is shown by a ploughing operation example and measuring the draft force 22, however, the invention not limited to just draft force, but is related to machine learning for agricultural implements 10 in general.

FIG. 3 shows an exemplary embodiment of a system 11 comprising an agricultural working means 110 comprising an agricultural working implement 116, which is depicted in form of a plough with plough shares 112. The agricultural working means 110 further comprises a driving means 114, which is depicted in form of a tractor, wherein the driving means 114 and the agricultural working implement 116 are interconnected. As shown, the driving means 114 is presently ploughing the soil of an agricultural field 1100. Although the preferred embodiment is a ploughing operation example, the present invention is not limited to this particular embodiment but is suitable for any agricultural application.

Further, a sensor 118 is provided in form of a draft sensor which measures the draft force of the driving means 114 that is applied to the agricultural working means 110.

The driving means 114 comprises two first imaging devices 20 in form of cameras, which are attached and arranged at the front side and the rear side of the driving means 114. The first imaging devices acquire images from the front and rear environment of the driving means 114. In the embodiment shown, a position unit 130 is provided at the driving means 114, which determines the position of the agricultural working means 110, in particular the positions of the driving means 114 and the agricultural working implement 116. The two first imaging devices 120 are connected to the position unit 130, such that data exchange between the position unit 130 and the first imaging devices 120 is enabled. The position unit can therefore determine the absolute positions of the two first imaging devices 120.

A data processing unit 150 for data processing of captured images and sensed data may be located at the agricultural working means 110. The data processing unit 150 comprises a data interpretation unit 151, a feature detection unit 152, a feature location determination unit 154, a feature determination unit 156 and a machine learning unit 158.

In the embodiment shown, a second imaging device 122 is provided at an autonomous aerial vehicle or drone 140. The autonomous aerial vehicle 140 acquires images from an altitude h above the agricultural field 1100. The imaging devices 120 and 122 are able to transfer their images to the data interpretation unit 151 of the data processing unit 150, which is provided at the driving means 114. The data interpretation unit 151 combines the provided image data by the first imaging device 120 and the second imaging device 122 to a combined map. The data interpretation unit 151 also interprets the optical data of the imaging devices 120 and 122 in relation to the position data provided by the position unit 130 and calculates an interpretation of any detected features such as feature 1110, which is depicted as a stone 1110 that is located in the agricultural field 1100. Further, the data interpretation unit 151 considers the measured sensor data of a sensor 118 at or for the agricultural implement and may calculates a 2D or a 3D map of the field. Data transfer between the imaging devices 120, 122 and the data processing unit 150 could be established in any suitable manner, for instance, as shown, in a wired connection as shown for the first imaging devices 120 and in a suitable wireless manner for the second imaging device 122.

In the embodiment shown, a position determination unit 132 is provided at the driving means 114. As depicted, the position determination unit 132 is a GPS receiver for determining of the exact position of the driving means 114, which exchanges data with the position unit 130. Thus, the GPS receiver is able to send and receive satellite position data and exchange this information with the position unit. However, the position determination unit 132 may also be arranged on the driving means 114, the agricultural working implement no or autonomous aerial vehicle 140 to determine respective absolute or relative positions of the respective parts of the system 11.

The data processing unit 150 further comprises the feature detection unit 152, which comprises a specific software to allow identifying features in the images and/or the map created by the images, such as feature 1110, which is a stone lying in the agricultural field 1100. The data processing unit 150 further comprises a feature location determination unit 154, which allows calculating the position of the detected feature. For this, respective images of the first imaging device 120 and the second imaging device 122 are combined considering the positions of the imaging devices 120 and 122 and the spatial dimensions and of the detected features, such as height, width and depth of feature 1110.

The data processing unit 150 further comprises the feature determination unit 156, which allows to identify respective attributes of said feature. For instance, in the embodiment shown, the feature determination unit 156 allows by determining the structure and color of feature 1110 that said feature is a stone and not an animal of the same spatial dimensions. Since some features can only be determined at a certain altitude or angle of detection, the autonomous aerial vehicle 140 could be directed to a position at a suitable altitude allowing acquisition at an optimal height and/or acquisition angle to properly identify, locate and determine said features. Respective information about the feature, its location and specific attributes can be combined and integrated in the combined map, which is accordingly presented to a user via a display device 160, which is provided at the driving means 114. The display device is located within the driving compartment of the driving means 114 such that a driver can directly see the images acquired by the imaging devices 120 and 122 and/or the combined map including detected features and/or any further derived values, which would allow the driver of the tractor to control the ploughing or adjust the altitude of the autonomous aerial vehicle 140 in order to inspect a respective feature further.

Further, a mapping unit 170 is provided at the driving means 114. The mapping unit receives the data of the data processing unit 150 and creates a map of data combining any image data, position data, and feature data obtained by the other units and devices provided in the system. Said map can be shown via the display device 160 to the driver and shows all relevant data of the present agricultural operation, including positioning of the driving means in the agricultural field, location and characteristics of any features.

For controlling the autonomous aerial vehicle 140 and/or the agricultural working means 110, an operation input controller 180 is provided at the driving means 114, which allows a user to adjust any desired parameter of interest such as for example driving speed of the driving means 114, orientation of the driving means 114 and/or the agricultural working implement 116, plunging depth of the ploughing shares 112, altitude of the autonomous aerial vehicle 140, movement of the imaging devices 120 and 122 etc.

The display device 160, the operation controller 180, the position unit 130, the data processing unit iso, the mapping unit 170 and one of the first imaging devices 120 can be also realized by a smart phone 162 that is attached to the agricultural working means 110. The smart phone 162 may run an application or program that enables integration and data transfer with the other elements of the system 11 and the agricultural working means.

The data processing unit 150 may further comprise cloud based intelligence 190 for real-time processing of data. Such cloud based intelligence 190 may be provided by an external server that is wirelessly connected to the data processing unit 150 via the 4G mobile data standard or WLAN or any other wireless data connection. The cloud based intelligence 190 can be from an external service provider and be located at any arbitrary physical location. The cloud based intelligence 190 can provide a very high computation power, used for example for a real-time 3D photogrammetry of the captured optical data.

Further, the data processing unit 150 preferably comprises a machine learning unit 158 that may calculate a determination of the features 1110, which were optically detected. The machine learning unit 158 uses known machine learning methods, like supervised learning, unsupervised learning, reinforcement learning and neural networks/deep learning. Thus, the machine learning unit 158 may use different machine learning tools to comply with different situations. Any of the machine learning operations can also be implemented at a remote location such as by the cloud based intelligence 190.

For a manual training of the machine learning unit 158 the user may input a confirmation or rejection of the automatic feature detection via the operation input controller 180, a touch sensitive display device 160 or the smart phone 162.

The invention claimed is:

1. A system for measuring and interpreting a force, the system comprising:
 a. at least one working implement, for acting on an agricultural field;
 b. at least one force sensor, for measuring a force of the working implement;
 c. a position unit, for determining the position of the working implement, wherein the positioning unit comprises a receiver for providing position data;
 d. a data memory unit, for receiving force data from the at least one force sensor and position data from the positioning unit; and
 e. a data interpretation unit, for interpreting the force data in relation to the position data, wherein the data interpretation unit calculates an interpretation of the measured force, and wherein the data interpretation unit comprises a machine learning unit that calculates the interpretation of the measured force; and
 the system further comprising:
 f. an input means for allowing the user to input confirmation data for confirming and rejecting the interpretation of the measured force, and
 g. wherein the machine learning unit of the data interpretation unit calculates the interpretation of the measured force based on confirmation data input by the user via the input means.

2. The system according to claim 1, further comprising
 a. a display means, for displaying at least the calculated interpretation of the measured force to a user.

3. The system according to claim 1, wherein the data interpretation unit further comprises a monitoring unit that
 a. calculates a prediction of the force based on previously collected force data;
 b. compares an actual measurement of the force with the prediction of the force; and
 c. generates an alert, when deviations occur between the actual measurement of the force and the prediction of the force.

4. The system according to claim 3, wherein the monitoring unit provides the interpretation of the force deviation to the user, preferably via a display means.

5. The system according to claim 1, further comprising a map unit, that provides graphical map data of an agricultural field, wherein map data is shown to the user via a display means together with the force data and/or the interpretation of the measured force.

6. The system according to claim 1, wherein the data interpretation unit provides the interpretation of the measured force based on standardized descriptors of field features and/or of soil parameters.

7. The system according to claim 1, wherein the machine learning unit of the data interpretation unit comprises a neural network.

8. The system according to claim 1, wherein the data interpretation unit calculates different interpretations of the measured force and assigns probabilities to the calculated interpretations.

9. The system according to claim 1, wherein a display means
 a. is arranged on a driving means that drives the working implement, wherein the user is able to see the display means while driving the driving means; and/or
 b. is arranged at a remote location.

10. The system according to claim 1, wherein the input means
 a. is arranged on a driving means that drives the working implement, wherein the user is able to input confirmation data while driving the driving means; and/or
 b. is arranged at a remote location.

11. The system according to claim 1, further comprising an input means for allowing the user to manually signalize an event, wherein the data memory unit further stores an event indication that is associated to data stored at the time of signalization.

12. The system according to claim 11, wherein after the event is signalized, the data memory unit or the data interpretation unit adds the event indication to data from a specified timeframe before the event and to data of a specified timeframe after the event.

13. The system according to claim 1, wherein the data memory unit further stores data obtained from a driving means that drives the working implement, and the data interpretation unit uses this data for the calculation of the interpretation of the force.

14. The system according to claim 1, further comprising at least one acceleration sensor arranged at the working implement, for providing acceleration data of the working implement, wherein the data memory unit further stores the acceleration data and the data interpretation unit uses this acceleration data for the calculation of the interpretation of the force.

15. The system according to claim 1, comprising at least two draft force sensors, for measuring the draft force required to move the working implement while working an agricultural field.

* * * * *